United States Patent [19]

Dessanti et al.

[11] Patent Number: 4,873,839
[45] Date of Patent: Oct. 17, 1989

[54] COMBUSTION-POWERED COMPOUND REFRIGERATION SYSTEM

[75] Inventors: Daniel J. Dessanti, Brooklyn; Hans P. Schorr, Douglaston, both of N.Y.

[73] Assignee: The Brooklyn Union Gas Company, Brooklyn, N.Y.

[21] Appl. No.: 255,436

[22] Filed: Oct. 11, 1988

[51] Int. Cl.$^4$ ............................................. F25B 27/00
[52] U.S. Cl. .................................. 62/238.6; 62/238.3; 62/332; 62/335; 62/476
[58] Field of Search .............. 62/332, 335, 476, 238.3, 62/238.6

[56] References Cited
U.S. PATENT DOCUMENTS 4,745,768  5/1988  Schorr et al. ...................... 62/332 X Primary Examiner—Lloyd L. King
Attorney, Agent, or Firm—Paul W. Garbo

[57] ABSTRACT

In refrigeration systems wherein the refrigerant compressor is driven by a prime mover powered by combustion of a fluid fuel, a notable saving in fuel consumption is achieved by utilizing waste heat in the hot exhaust gases from the prime mover in an ammonia absorption refrigeration unit to produce refrigeration in the form of liquid ammonia. Subcooled liquid ammonia is used to subcool the compressed and condensed refrigerant prior to its expansion and evaporation to produce saleable refrigeration. This compound refrigeration system is economically attractive for producing large tonnage refrigeration particularly when a combustion turbine coupled to a centrifugal compressor is used.

14 Claims, 1 Drawing Sheet

COMBUSTION-POWERED COMPOUND REFRIGERATION SYSTEM

BACKGROUND OF THE INVENTION

This invention relates to improved refrigeration from systems wherein the refrigerant compressor is driven by power generated by combustion of a fluid fuel, i.e., gas or liquid, such as natural gas or diesel oil, to propel an engine or turbine. More particularly, the invention utilizes the hot exhaust gases of such a combustion-powered prime mover to reduce the energy consumption of refrigeration production.

The basic mechanical refrigeration system is a closed cycle or loop generally involving a compressor, a condenser and an evaporator. Frequently, the refrigeration system includes a subcooler between the condenser and the evaporator. The compressor is often driven by an electric motor but for the production of tonnage refrigeration, where a fluid fuel is cheaper than electricity, the compressor is driven by an internal combustion engine or a combustion turbine.

A principal object of this invention is to enhance the saving in energy cost of mechanical refrigeration systems wherein an engine or turbine drives the refrigerant compressor.

A further object is to utilize the waste heat in the exhaust gases of the engine or turbine to achieve substantial decrease of fuel consumption in refrigeration production.

Another important object is to utilize the well known ammonia absorption refrigeration system to convert the waste heat of the exhaust gases of a combustion-powered prime mover into refrigeration which is applied to the compressed and condensed main refrigerant to effect its subcooling.

These and other objects and advantages of the invention will be apparent from the description which follows.

SUMMARY OF THE INVENTION

In accordance with this invention, a mechanical refrigeration system wherein the refrigerant compressor is driven by a combustion engine or turbine has an ammonia absorption refrigeration system connected for the flow of hot exhaust gases from the engine or turbine through the heating tubes in the desorber of the ammonia absorption refrigeration system and further connected to circulate liquid ammonia from the absorption refrigeration unit to a subcooler for the compressed and condensed main refrigerant, and for the return of ammonia vapor to the absorption unit. Some ammonia absorption refrigeration units available in commerce operate with steam or hot water; in such cases, the hot exhaust gases heat water or generate steam which is then passed through the heating tubes in the desorber of the absorption refrigeration system. Hence, the hot exhaust gases of the prime mover are advantageously used directly or indirectly to generate refrigeration in the ammonia absorption unit.

As known in the mechanical art, there are available several combinations of combustion-powered prime movers and compressors. An internal combustion engine may drive a reciprocating compressor or a screw compressor. A combustion turbine may drive a screw compressor or a centrifugal compressor. Ideally, a turbine is directly coupled to a centrifugal compressor.

The ammonia absorption refrigeration system used pursuant to this invention is offered today as a standard unit by several prominent companies, such as Linde AG of West Germany and Refrigeration Engineering Corporation of San Antonio, Tex. These commercial refrigeration systems absorb ammonia vapor in water, pump the aqueous ammonia solution to a desorber from which vaporized ammonia and water pass up through a distillation column to a condenser to form liquid ammonia that when vaporized acts as a refrigerant. The return of ammonia vapor to the absorber completes the ammonia absorption refrigeration cycle.

BRIEF DESCRIPTION OF THE DRAWINGS

For a fuller understanding of the invention, the ensuing description will refer to the appended drawings of which.

DESCRIPTION OF PREFERRED EMBODIMENTS

Figure 1:
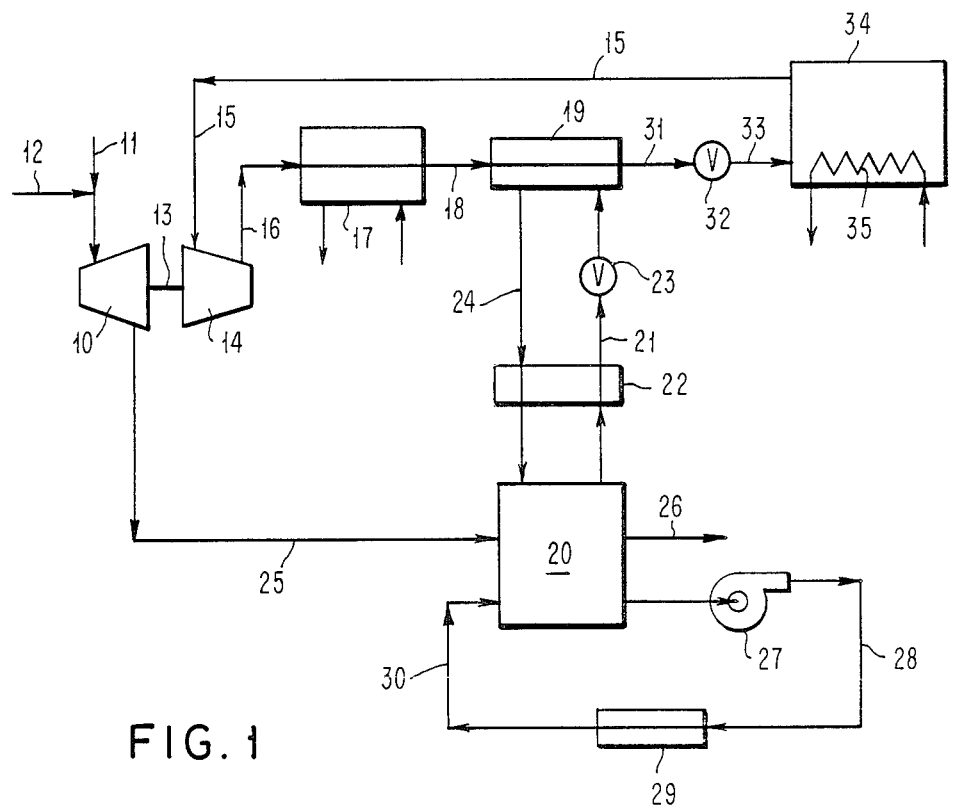
FIG. 1 is a flow diagram of a preferred embodiment of this invention.

The description of FIG. 1 will include data of a specific example of the invention.

Natural gas with a low (net) heating value of 965 British Thermal Units per standard cubic foot enters the combustor of gas turbine 10 via line 11 with the required amount of combustion air from line 12. The rate of natural gas consumption is 20,500 standard cubic feet per hour (SCFH). The power generated by turbine 10 is transferred through single-shaft coupling 13 to centrifugal compressor 14 which increases the pressure of Freon R-12 (DuPont) refrigerant vapor entering via line 15 at about 15 pounds per square inch absolute (psia) and temperature of −20° F. and exiting via line 16 at 137 psia and about 185° F. Freon R-12 has a molecular weight of 121 and is circulated by compressor 14 at the rate of 1400 pound mols mols per hour (PMH). The warm compressed refrigerant passes through condenser 17 which in this example is cooled by water at 85° F. The condensed refrigerant at 135 psia and 100° F. flows from condenser 17 through line 18 to subcooler 19 from which it discharges at 133 psia and −20° F. The subcooling of the compressed and condensed refrigerant Freon R-12 is accomplished with subcooled liquid ammonia supplied by ammonia absorption refrigeration system 20. Liquid ammonia from system 20 passes through its subcooler 22 before flowing via line 21 through pressure-reducing valve 23 whence at a pressure of 14.8 psia and temperature of −28° C. it discharges into Freon R-12 subcooler 19 which acts as the ammonia evaporator. Ammonia vapor at a temperature of −28° F. flows back through line 24 and subcooler 22 to be warmed prior to its absorption in ammonia refrigeration system 20; thus by warming ammonia vapor of line 24 in subcooler 22, liquid ammonia of line 21 is subcooled. The subcooled liquid ammonia is supplied to Freon R-12 subcooler 19 at the rate of 7700 pounds per hour.

The hot exhaust gases leave turbine 10 through line 25 at 15.2 psia and approximately 1165° F. and pass through the desorber of ammonia refrigeration system 20. The waste heat of the exhaust gases is utilized in the desorber of system 20 to vaporize ammonia and water which pass through the distillation column of system 20. The exhaust gases are vented at about 330° F. from unit 20 to the atmosphere via line 26. As known, absorption unit 20 requires the passage of cooling water therethrough for condensing ammonia vapor and removing absorption heat when ammonia vapor is dissolved in water. For this purpose, unit 20 is provided with a cooling water loop in which pump 27 draws warm water at about 100° F. from unit 20 and circulates it through line 28, cooler 29 and line 30 back to unit 20. In this example, cooler 29 is a cooling tower which lowers the temperature of the cooling water to about 85° F. Cooler 29 may be an air cooler.

The condensed refrigerant leaving subcooler 19 at 133 psia and −20° F. flows through line 31 and pressure-reducing valve 32. The expanded Freon R-12 refrigerant discharges from line 33 at 15.3 psia and −20° F. into evaporator 34 which is provided with refrigeration recovery coil 25. Antifreeze or other suitable fluid with a freezing point lower than −20° F. is passed through coil 35 to convey the recovered refrigeration through one or more operations requiring refrigeration, such as the commercial freezing of fish and meat. The antifreeze passing through coil 35 conveys 1000 tons of refrigeration at −20° F. to refrigeration consumers.

Refrigerant vapor at 15.3 psia and −20° F. returns from a evaporator 34 through line 15 to centrifugal compressor 14 to complete the circulation of Freon R-12 refrigerant through the mechanical refrigeration loop.

Without utilizing the heat in the exhaust gases from turbine 10 in absorption refrigeration system 20 to provide the subcooled ammonia liquid for exchanger 19 to subcool the liquid Freon R-12 refrigerant, the energy consumption of the refrigeration system would be approximately 45% greater than that of the example using ammonia absorption refrigeration unit 20 to effect subcooling of Freon R-12 refrigerant. The invention clearly achieves a remarkable fuel saving. U.S. Pat. No. 4,745,768 to the inventors of the novel refrigeration system herein disclosed and claimed involves a different combination of a mechanical refrigeration cycle with an absorption refrigeration cycle based on an aqueous solution of lithium halide as absorbent. In the patent refrigeration system, water chilled by the absorption unit is used to condense the refrigerant vapor of the mechanical cycle while the present invention, subcooled liquid ammonia supplied by the absorption unit is evaporated by indirect heat transfer with liquid refrigerant of the mechanical cycle to effect substantial subcooling of that liquid refrigerant.

Figure 2:
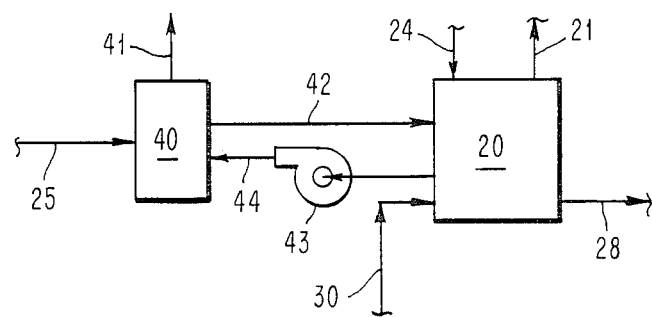
FIG. 2 is a variation of part of the flow diagram of FIG. 1.

As previously mentioned, some ammonia absorption refrigeration systems operate with steam heat. FIG. 2 shows diagrammatically how the flow diagram of FIG. 1 is modified when absorption unit 20 requires heating with steam. In such case, the hot exhaust gases from turbine 10 flow through line 25 into steam generator 40 wherein waste heat in the exhaust gases produces steam. The resulting cooled exhaust gases are vented to the atmosphere through line 41. Steam flows from generator 40 via line 42 to the desorber of ammonia absorption system 20. Condensed steam is recycled from system 20 by pump 43 and line 44 back to steam generator 40. In all other respects, the flow diagram of FIG. 1 remains unchanged. FIG. 2 also applies when hot water instead of steam is used to heat unit 20.

While the foregoing example is based on the use of Freon R-12, other fluorocarbons such as DuPont's R-22 may be selected as the refrigerant. Other practical refrigerants include ammonia, propane and propylene.

The temperature level at which refrigeration is delivered by this invention can be varied over the commercially important range of about 35° F. down to −80° F. As known in the refrigeration art, the desired refrigeration temperature level is attained by selecting an appropriate refrigerant and controlling the pressures of the refrigerant on entering the condenser and on leaving the evaporator of the mechanical refrigeration loop.

The fuel saving achieved by this invention is significant for refrigeration systems delivering at least about 100 tons of refrigeration; for such low refrigeration tonnage, an internal combustion engine is currently the only practical prime mover for the refrigerant compressor, the reciprocating or screw type. Better fuel savings are attained in systems delivering at least 400 tons of refrigeration because in such larger systems it is feasible to use the efficient combination of a combustion on turbine coupled to a screw compressor or centrifugal compressor. The benefits of this invention are applicable to existing refrigeration systems wherein the compressor is driven by a combustion-powered prime mover. The retrofit of such existing systems is economically attractive particularly for those producing 200 to 500 tons of refrigeration, and simply involves the purchase and installation of an ammonia absorption refrigeration unit to utilize waste heat from the hot exhaust gases of the primer mover and to evaporate subcooled liquid ammonia from the unit against the compressed and condensed refrigerant of the mechanical refrigeration cycle. The fuel economy obtained by this invention makes the building and operation of new refrigeration systems with capacities of 500 to 5000 tons of refrigeration particularly profitable.

Variations and modifications of the invention will be apparent to those skilled in the art without departing from the spirit and scope of the invention. For example, while the ammonia absorption refrigeration system used by the invention to reduce the consumption of fuel is generally the simple single-stage absorption system, two-stage ammonia absorption refrigeration systems are available and can be advantageously used to subcool the refrigerant of the mechanical refrigeration cycle when the exhaust gases of the prime mover have a relatively low temperature and/or the available cooling water has a relatively high temperature. Also, while water is used in the example as coolant in both condenser 17 and the cooling loop comprising line 28, cooler 29 and line 30, air may be a substituted coolant in either condenser 17 or the cooling loop, or both. Accordingly, only such limitations should be imposed on the invention as are set forth in the appended claims.

What is claimed is:

1. An improved refrigeration system comprising a refrigerant vapor compressor driven by a prime mover powered by the combustion of a fluid fuel, a condenser connected to said compressor to condense the hot compressed refrigerant vapor, a heat exchanger connected to receive the condensed refrigerant and to effect subcooling thereof, a pressure-reducing valve connected for the expansion of the subcooled refrigerant and for the discharge of the expanded refrigerant into an evaporator equipped with heat transfer surface for the recovery of refrigeration from said evaporator by a fluid passed in contact with said heat transfer surface, said evaporator being connected to pass refrigerant vapor therefrom back to said compressor, and an ammonia absorption refrigeration unit connected to utilize waste heat of the hot exhaust gases from said prime mover and further connected to pass liquid ammonia through an ammonia subcooler, said subcooler being connected for the flow of subcooled liquid ammonia through a pressure-reducing valve to said heat exchanger to effect said subcooling of said condensed refrigerant by evaporation of said liquid ammonia, said heat exchanger being connected for the return of ammonia vapor through said subcooler to said absorption refrigeration unit.

2. The refrigeration system of claim 1 wherein the compressor is a screw compressor or centrifugal compressor and the combustion-powered prime mover is a combustion turbine.

3. The refrigeration system of claim 1 wherein the compressor is a reciprocating compressor or screw compressor and the combustion-powered prime mover is an internal combustion engine.

4. The refrigeration system of claim 1 wherein the refrigerant is selected from the group consisting of fluorocarbons, ammonia, propane and propylene.

5. The refrigeration system of claim 1 wherein the compressor is a centrifugal compressor, the combustion-powered prime mover is a combustion turbine coupled to said centrifugal compressor, and the refrigerant is of the fluorocarbon type.

6. The refrigeration system of claim 1 wherein the compressor is a screw compressor, the combustion-powered prime mover is a diesel engine and the refrigerant is of the fluorocarbon type.

7. The refrigeration system of claim 1 wherein the condenser is cooled by water or air.

8. The improved refrigeration process which comprises combustion a fluid fuel for the performance of work by a prime mover, utilizing said performance of work to compress refrigerant vapor, condensing the compressed refrigerant vapor, subcooling the condensed refrigerant by heat exchange with subcooled liquid ammonia as herebelow specified, isenthalpically expanding the subcooled refrigerant, discharging the expanded refrigerant into an evaporation zone, returning refrigerant vapor from said evaporation zone to the aforesaid compression thereof, utilizing waste heat in the hot combustion gases leaving said prime mover to operate an ammonia absorption refrigeration unit, subcooling liquid ammonia from said absorption refrigeration unit, isenthalpically expanding the subcooled liquid ammonia, passing the expanded liquid ammonia in heat exchange with said condensed refrigerant to effect evaporation of said liquid ammonia and the aforesaid subcooling of said condensed refrigerant, and returning the resulting ammonia vapor to said absorption refrigeration unit.

9. The improved refrigeration process of claim 8 wherein the pressure of the refrigerant during condensation and during evaporation is controlled to produce refrigeration at a temperature in the range of about 35° F. down to −80° F.

10. The improved refrigeration process of claim 8 wherein the fluid fuel is natural gas, and the pressure of the refrigerant during condensation and during evaporation is controlled to produce refrigeration at a temperature of about −20° F.

11. The improved refrigeration process of claim 8 wherein the utilization of the waste heat in the hot combustion gases leaving the prime mover involves the passage of said gases through the ammonia absorption refrigeration unit.

12. The improved refrigeration process of claim 8 wherein the utilization of the waste heat in the hot combustion gases leaving the prime mover involves generating steam with said gases and passing said steam through the ammonia absorption refrigeration unit.

13. The improved refrigeration process of claim 9 wherein the fluid fuel is natural gas, the refrigerant is of the fluorocarbon type, and the utilization of the waste heat in the hot combustion gases leaving the prime mover involves the passage of said gases through the ammonia absorption refrigeration unit.

14. The improved refrigeration process of claim 9 wherein the utilization of the waste heat in the hot combustion gases leaving the prime mover involves producing hot water or steam with said gases and passing said hot water or steam through the ammonia absorption refrigeration unit.

* * * * *

UNITED STATES PATENT OFFICE
CERTIFICATE OF CORRECTION

Patent No. 4,873,839                                      Dated  October 17, 1989

Inventor(s) Daniel J. Dessanti and Hans P. Schorr

It is certified that error appears in the above-identified patent and that said Letters Patent is hereby corrected as shown below:

Claim 2, line 52 "-28°C." should read --  -28°F.--.

Claim 3, line 17, "coil 25." should read --coil 35.--;

line 25, "from a" should read --from--;

line 42, "patent" should read --patented--;

line 45, "while" should read --while in--.

Column 4, line 17, "combustion on" should read --combustion--;

line 48, "substituted" should read --substitute--.

Column 5, line 32, "combustion" should read --combusting--;

line 39, "zone, return- " should read

--zone, recovering refrigeration from said evaporation zone, return

Signed and Sealed this

Seventh Day of August, 1990

Attest:

HARRY F. MANBECK, JR.

Attesting Officer        Commissioner of Patents and Trademarks